United States Patent [19]
Holka

[11] Patent Number: 5,609,365
[45] Date of Patent: Mar. 11, 1997

[54] ENERGY ABSORBING APPARATUS FOR A MOTOR VEHICLE

[75] Inventor: Thomas C. Holka, Milford, Mich.

[73] Assignee: Ford Motor Company, Dearborn, Mich.

[21] Appl. No.: 570,029

[22] Filed: Dec. 11, 1995

[51] Int. Cl.⁶ .................. B62D 1/11; B60R 22/28
[52] U.S. Cl. .......................... 280/777; 280/805
[58] Field of Search ................... 280/777, 805, 280/806

[56] References Cited

U.S. PATENT DOCUMENTS

| | | | |
|---|---|---|---|
| 3,444,962 | 5/1969 | Lech | 188/371 |
| 4,027,905 | 7/1977 | Shimogawa et al. | 297/472 |
| 4,273,361 | 6/1981 | Takei et al. | 280/805 |
| 4,358,136 | 11/1982 | Tsuge et al. | 280/806 |
| 4,449,747 | 5/1984 | Morgan et al. | 156/212 |
| 4,588,208 | 5/1986 | Yoshitsugu | 280/805 |
| 4,606,411 | 8/1986 | Markov | 280/805 |
| 4,630,716 | 12/1986 | Faust | 188/371 |
| 4,643,448 | 2/1987 | Loren | 280/777 |
| 4,802,691 | 2/1989 | Watkins | 280/751 |
| 4,828,287 | 5/1989 | Siler | 280/751 |
| 4,854,608 | 8/1989 | Barral | 280/805 |
| 4,978,139 | 12/1990 | Andres et al. | 280/805 |
| 5,024,118 | 6/1991 | Khalifa et al. | 74/492 |
| 5,050,906 | 9/1991 | Kneip | 280/805 |
| 5,067,747 | 11/1991 | Yokoyama | 280/777 |
| 5,356,179 | 10/1994 | Hildebrandt et al. | 280/777 |

FOREIGN PATENT DOCUMENTS 5-77737  3/1993  Japan .

*Primary Examiner*—Kenneth R. Rice
*Attorney, Agent, or Firm*—Gregory P. Brown

[57] ABSTRACT

An energy absorbing apparatus having first and second members (20,28) with a plurality of interlocking projections thereon for resisting motion between the first and second members (20,28). An energy absorber as disclosed may be used in passive restraint systems of motor vehicles (10). Examples are shown with the energy absorbing apparatus integrated in a steering column system (12) and a seat belt system (14). Specifically, the interlocking projections (36) on the first and second surfaces (22,34) of the first and second members (20,28) permit an impact force to be dissipated at a variable rate as the second member 28 is forced past the first member (20).

12 Claims, 4 Drawing Sheets

ENERGY ABSORBING APPARATUS FOR A MOTOR VEHICLE

BACKGROUND OF THE INVENTION

1. Field of the Invention

This invention relates generally to occupant restraints as used in motor vehicles. More specifically, the present invention relates to an energy absorbing apparatus for use in occupant restraint systems, such as seat belts and steering columns, that provides variable energy absorption.

2. Disclosure Information

Energy absorbing devices for controlling the deceleration of an object have been used in motor vehicles for some time. Generally, all of these devices operate in response to being subjected to an impact force exceeding a predetermined minimum value. The energy associated with this impact force is dissipated by controllably decelerating the impacting object. This deceleration occurs over a predetermined distance while a device absorbs the energy initially possessed by the impacting object.

One such system is disclosed in U.S. Pat. No. 4,027,905, which illustrates a seat belt system for a motor vehicle having an energy absorbing device anchoring the seat belt to a motor vehicle body structure. Responsive to an impact force in excess of a predetermined minimum, a planar steel strip is forcibly drawn through a plurality of pins causing the strip to plastically deform, thereby absorbing energy. As the strip is drawn through the pins, the impacting object decelerates within a predetermined maximum deceleration. To maintain the initial deceleration below the predetermined maximum requires the proper selection of the thickness, width and material properties of the strip. After the initial deceleration, however, due to momentum and friction effects the impacting object may decelerate at a rate considerably less than the predetermined deceleration maximum. This results in a considerable reduction in the energy absorbed for a given distance of travel than might otherwise be desired.

It would therefore be desirable to have a energy absorbing system capable of variable impact force dissipation properties.

SUMMARY OF THE INVENTION

The present invention provides an energy absorbing apparatus for a motor vehicle, including a deformable strip having performed projections for providing variable force dissipation during the displacement of the strip through a set of rollers.

In the presently preferred embodiment, the energy absorbing apparatus comprises an anchor securely attached to the motor vehicle and a first member mounted to the anchor and having a first surface. A second member is located adjacent to the first member in such a way as to present a second surface a predetermined distance from the first surface. The second member is adapted to receive an impact force from within the motor vehicle.

The first surface further includes a plurality of first projections adapted to engage a plurality of second projections disposed on the second surface. The first and second projections are adapted to disengage when the impact force exceeds a predetermined minimum, thereby providing sliding resistance between the second member and said member to controllably dissipate and absorb energy from the impact force.

It is an advantage of the energy absorber to provide variable force dissipation to controllably diminish the energy of the impact force by displacing the projections on one surface relative to the projections on another surface in a shearing motion.

Other objects, features and advantages of the present invention will become apparent to those skilled in the art from the drawings, detailed description and claims which follow.

DETAILED DESCRIPTION OF THE PREFERRED EMBODIMENTS

Figure 1:
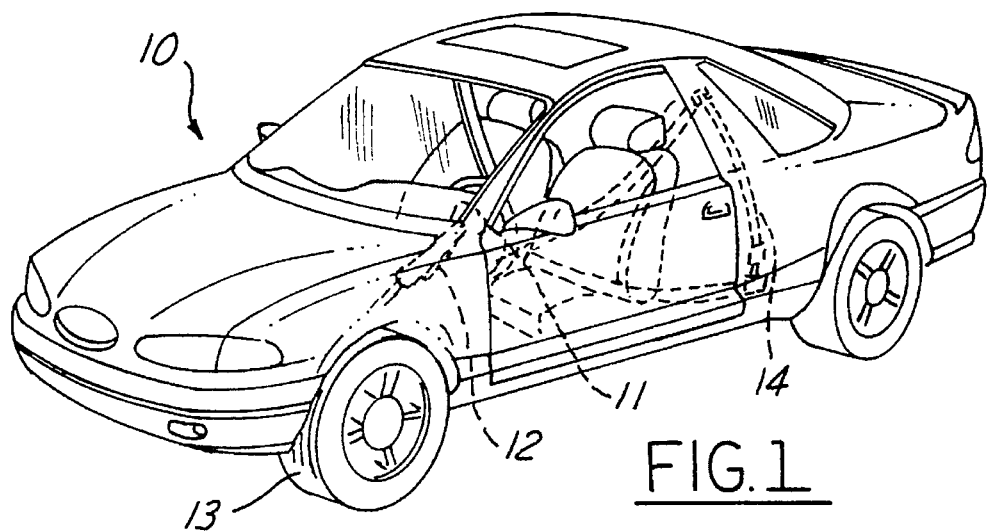
FIG. 1 is a perspective drawing of a motor vehicle incorporating an energy absorbing apparatus according to the present invention.

Referring now to the figures, FIG. 1 illustrates a motor vehicle 10 having a steering column system 12 for presenting a steering wheel 11 to an operator of the motor vehicle 10. The sneering wheel 11 is connected to a pair of dirigible road wheels 13 for sneering the motor vehicle 10. The motor vehicle also includes a seat belt system 14 for restraining occupants within the motor vehicle. As will be explained in detail below, an energy absorbing apparatus according to the present invention may be integrated into systems such as the steering column system 12 and the seat belt system 14.

Figure 2:
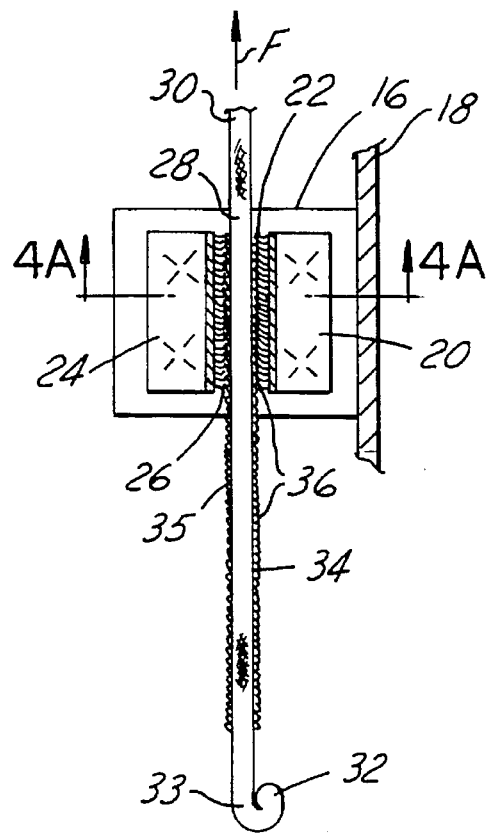
FIG. 2 is a top view of a first embodiment of an energy absorbing apparatus according to the present invention.
Figure 3:
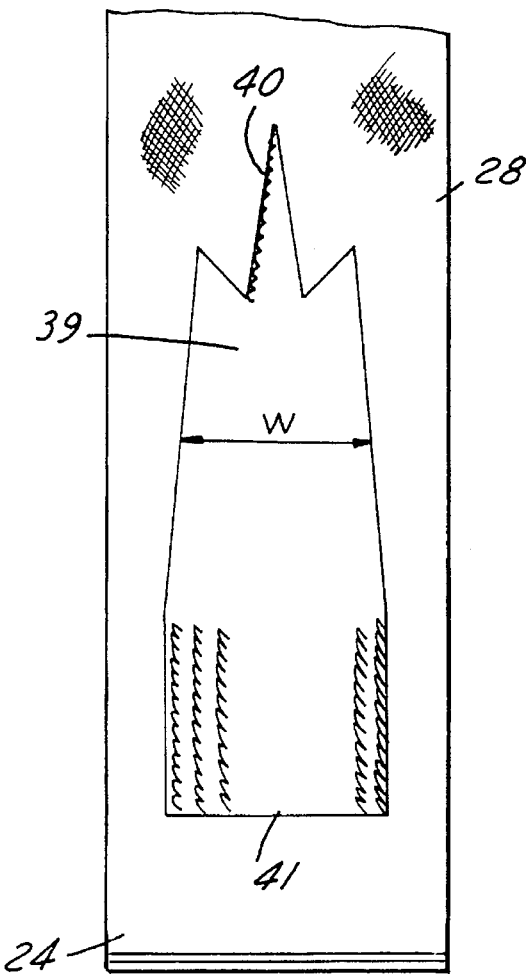
FIG. 3 is a side view of a first embodiment of an energy absorbing apparatus according to the present invention.

Referring to FIGS. 2–4, a first embodiment of the present invention will now be described. An anchor 16 securely attaches the energy absorbing apparatus to a structural member 18 within the motor vehicle 10, such as pillar, rocker panel or instrument panel. A first member 20 is mounted to the anchor 16 and includes a first surface 22. Mounting may be accomplished by welding, riveting, threaded fasteners or an equivalent. A guide member 24 is mounted on the anchor 16, adjacent to the first member 20 and having a guide surface 26 facing the first surface 22. The guide member 22 is spaced apart from the first member 20 a predetermined distance to receive a second member 28 therebetween.

The second member 28 includes a first end 30 attached to a component within the motor vehicle 10 for transferring an impact force (F) into a tension force within the second member 28. The second member 28 also includes a travel stop 32 disposed at a second end 33, opposite the first end 30. The second member 28 includes a second surface 34 facing the first surface 22 and a bearing surface 35 facing the guide surface 26.

Figure 4A:
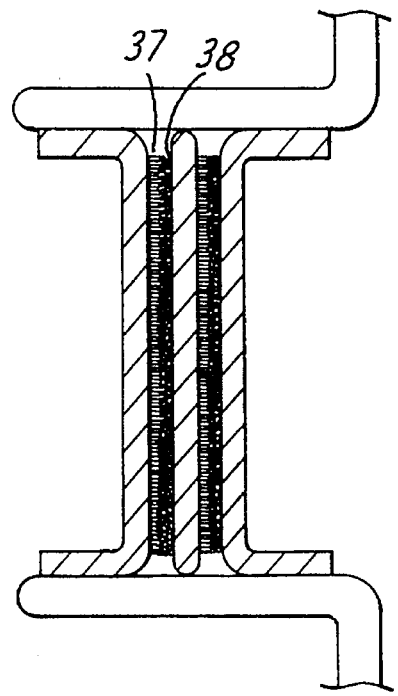
FIG. 4A is a top view showing a plurality of projections adapted to engage one another according to the present invention.
Figure 4B:
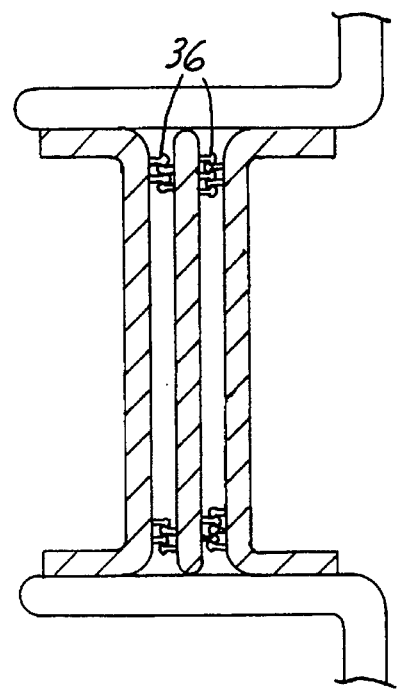
FIG. 4B is a top view showing a plurality of projections adapted to engage one another according to the present invention.

A portion of each of the first and second surfaces 22, 34 have a plurality of interlocking projections 36 molded or bonded thereto. These projections may take a variety of forms, as illustrated in FIGS. 4A and 4B. The hook 37 and loop 38 represent one commonly recognized form of interlocking projections that may be for the purposes described herein. Alternatives, such as that shown in FIG. 4B, provide similar engagement and disengagement properties as contemplated in the present invention.

Referring back to FIG. 3, the projections 36 on the second surface 34 (as well as on the first surface 22) may be configured in a predetermined shape to provide a variable surface area. As an example, a portion 39 of the second surface 34 covered projections 36 may have a leading edge 40 and a trailing edge 41. The area of this portion 39 covered by projections 36 may then be defined to have a variable width (W). The shape of the portion 39 covered by projections 36 may take many forms and sizes, depending on the energy absorption required in a particular application.

In the preferred embodiment, projections 36 are also disposed on the guide and bearing surfaces 26, 35. Advantageously, the selection of total area of the portion of projections on the guide and bearing surfaces 26, 35 is independent of that selected for the first and second surfaces. An advantage of having projections on the first and second surfaces 22, 34 as well as the guide and bearing surfaces 26, 35 is the squeak and rattle damping provided by the projections. This requires that there must be some engagement prior to impact. To accommodate this, the portion of projections on the second surface 34 and the bearing surface 35 extends toward the first end 30 sufficiently to engage the projections 36 on the first and bearing surfaces 22, 26. To prevent difficulties in assembly, the guide member 24 should be mounted to the anchor 16 after installation, or with removable fasteners to allow service.

Figure 5:
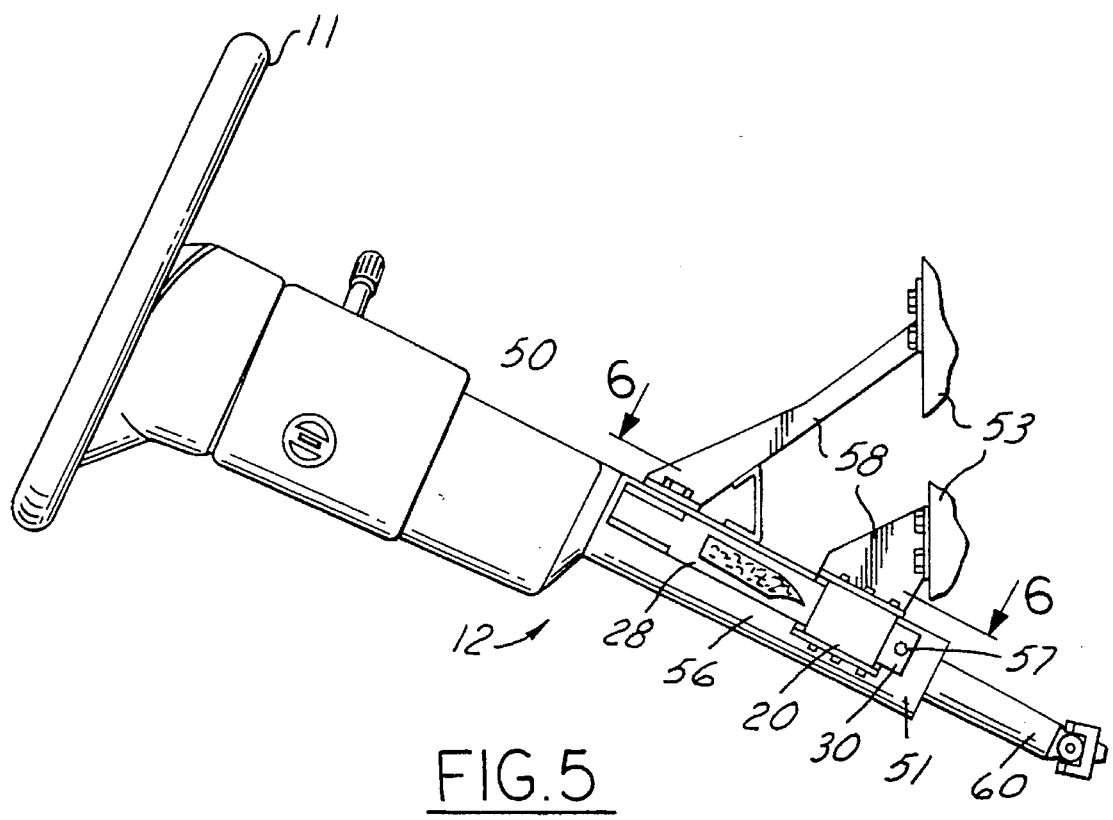
FIG. 5 is a side view of a steering column having an energy absorbing apparatus according to the present invention.
Figure 6:
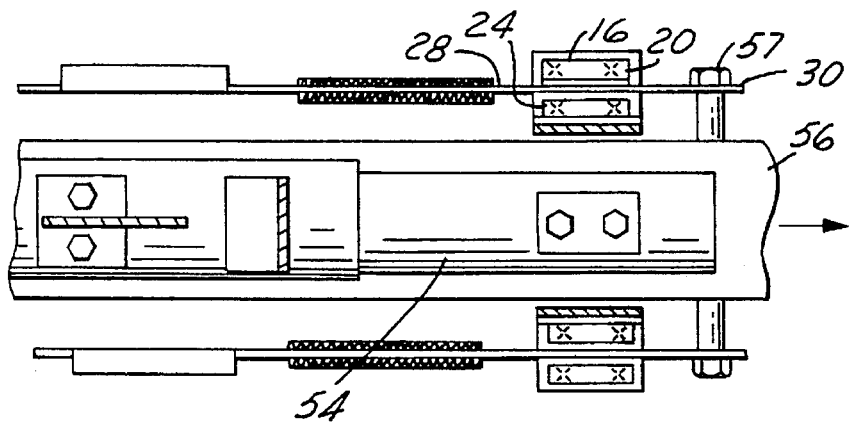
FIG. 6 is a sectional view taken from FIG. 5 showing the top of a steering column having an energy absorbing apparatus according to the present invention.

Referring now to FIGS. 5 and 6, a steering column system 12 having an energy absorbing apparatus according to the present invention is shown. The steering column system includes a steering column 50 extending from steering wheel 11 to a lower end 51 and a steering shaft 60 extending therefrom for transmitting steering wheel rotation to a steering mechanism (not shown). The steering column 50 further includes an outer member 56 axially disposed about an inner member 54. A support member 58 supports the inner member 54 from a portion of the body structure 53 and permits relative axial movement between the inner member 54 and the outer member 56 when the steering wheel 11 is loaded by an impact force. The outer member 56 attaches to the energy absorbing apparatus using fasteners 57 passing through the first end 30 of the second member 28. The anchor 16 securely fastens the first and guide members 20, 24 to the support member 58.

Figure 7:
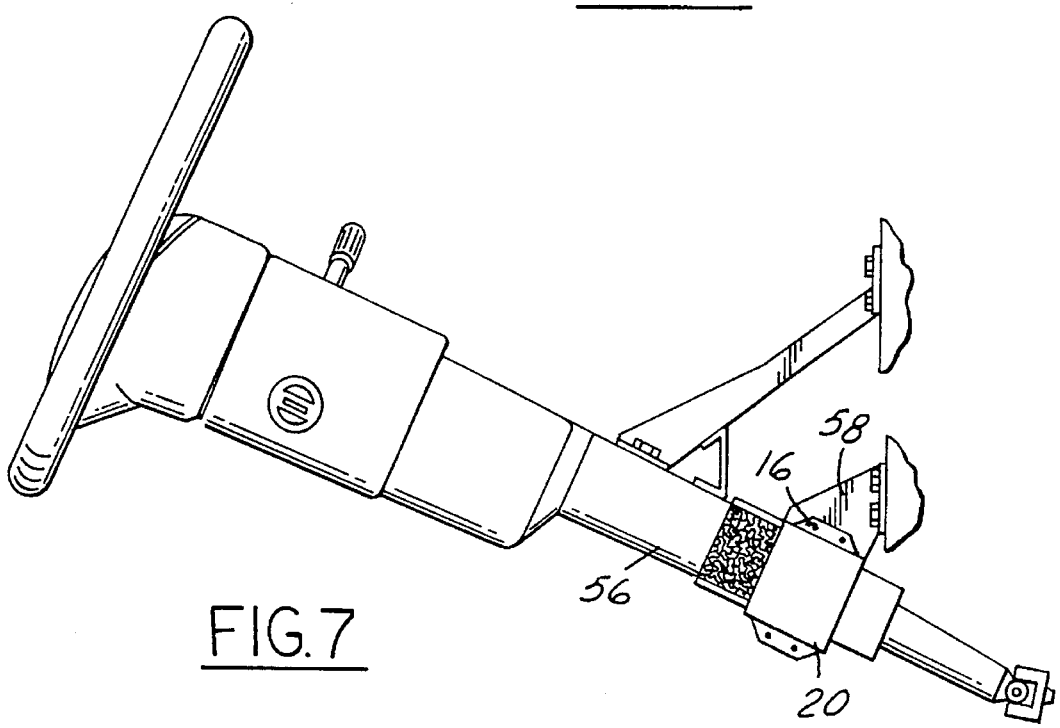
FIG. 7 is a side view of a steering column having an alternative embodiment of an energy absorbing apparatus according to the present invention.
Figure 8:
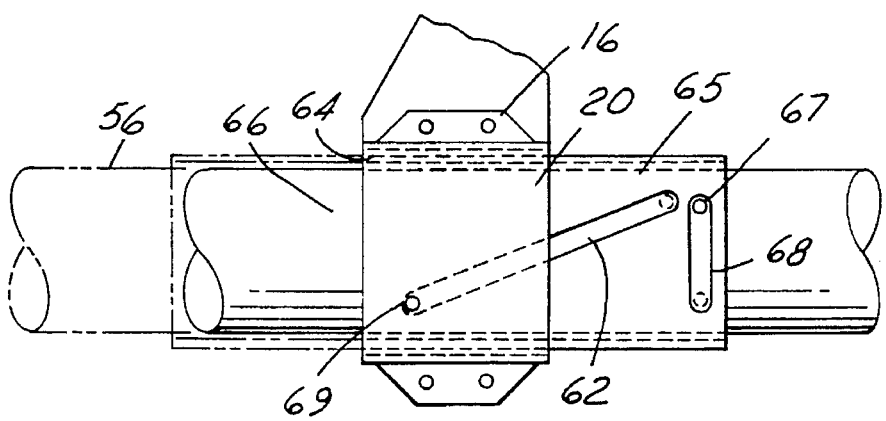
FIG. 8 is a sectional view taken from FIG. 7 showing the top of a steering column having an alternative embodiment of an energy absorbing apparatus according to the present invention.

Referring now to FIGS. 7–8, an alternative embodiment for is shown adapted for use in a steering column system 12. The anchor 16 is securely fastened to the support member 58 and is preferably integral with a tubular clamp 63. The first surface 22 is disposed on an inner side 64 of the two piece tubular clamp 63. A tubular member 65 is rotatably disposed on the outer member 56 of the steering column. The second surface 34 is disposed on an outer side 66 of the tubular member 65. A drive pin 67 attached to the outer member 56 engages a drive slot 68 disposed in the tubular member 65 to transfer the impact force from the outer member 56 to the tubular member 65. A rotation pin 69 attached to the tubular clamp 63 for engagement with a rotation slot 62 helically disposed on said tubular member 65 may also be included. The rotation pin forces the tubular member 65 to rotate, thereby increasing the capacity of energy that can be absorbed for a given linear displacement of the outer member 56. This would be beneficial where package space might not exist.

Figure 9:
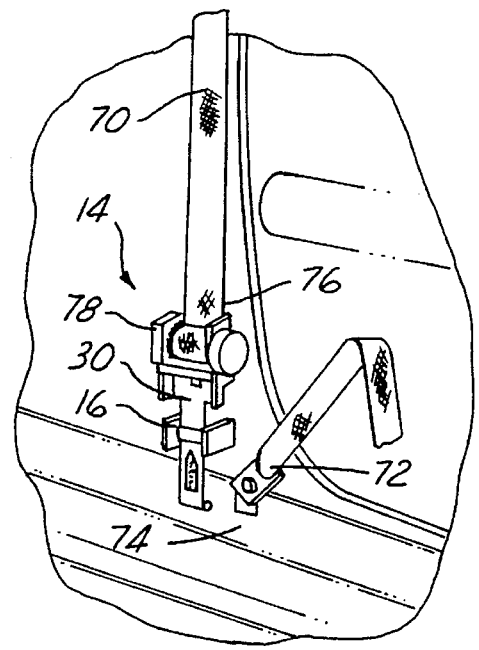
FIG. 9 is a perspective view of a seat belt system having an energy absorbing apparatus according to the present invention.
Figure 10:
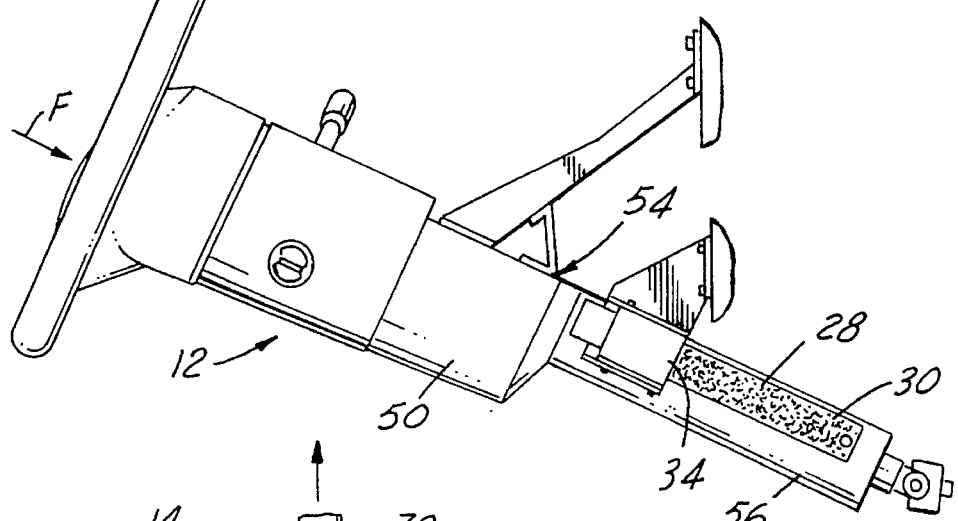
FIG. 10 is a side view of a steering column having an energy absorbing apparatus that has absorbed energy from an impact force according to the present invention.

FIG. 9 illustrates a seat belt system 14 having an energy absorbing apparatus according to the present invention. The seat belt system 14 includes seat belt 70 having one end 72 securely attached to a rocker panel 74 and the opposite end 76 attached to a conventional locking retractor mechanism 78. The retractor mechanism 78 is attached to the energy absorbing apparatus at the first end 30 of the second member 28. An anchor 16 is securely attached to the pillar 75 and supports the first member 20 and the guide member 24 with a predetermined space therebetween through which the second member 28 passes. It should occur to those skilled in the art that the tubular embodiment described in reference to FIGS. 7–8 would offer similar advantages if applied to a seat belt system.

Figure 11:
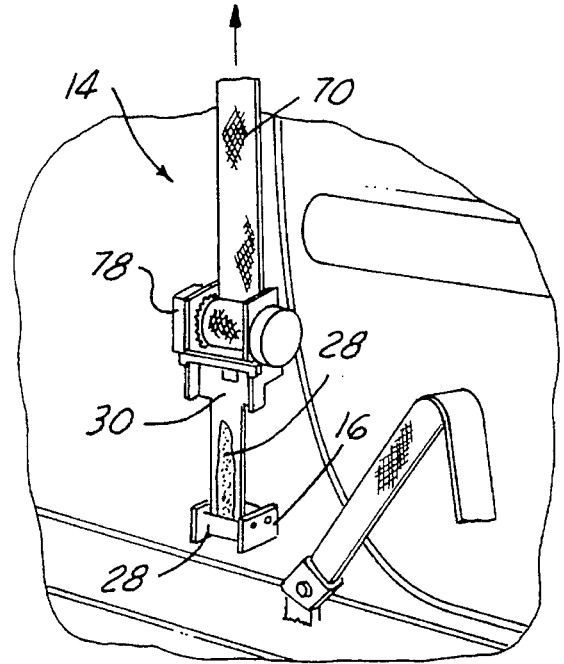
FIG. 11 is a side view of a seat belt system having an energy absorbing apparatus that has absorbed energy from an impact force according to the present invention.

Operation of the present invention will now be described with reference to FIGS. 11 and 12. In the steering column system 12, an object impacts the steering wheel 52 generating an impact force in proportion to the deceleration of the object. When the impact force exceeds a predetermined minimum, the outer member 56 begins to move relative to the inner member 54. This motion is impeded by the resistance to disengagement of the engaged projections 36 on the first and second surfaces 22, 34. This resistance thereby controls the deceleration of the object impacting the steering wheel 11 and the dissipation of the impact force (F). It is desirable to control the rate at which this impacting object is decelerated and this can be done by controlling the dissipation of the impact force (F) that the outer member 56 transfers to the second member 28.

Initially, movement of the second member 28 is impeded either at the outset, if the projections 36 are engaged prior to impact, otherwise, resistance builds when the leading edge 49 on the second surface 34 initially engages the projections 36 on the first surface 22. The resistance is proportional to the total area of projections that are engaged. Effective engagement is controlled by the predetermined interference between the projections on the first surface with the projections on the second surface. Once the impact force (F) exceeds a predetermined resistance, the second member 28 progresses past the first member 20. In the preferred embodiment, additional projections 36 will engage the projections on the first member 20, as the width (W) increases, thereby increasing the resistance to movement of the second member 28. By varying the area of the projections 36 in this manner, the impact force dissipation can be programmed to vary continuously as the second member 28 passes the first member 20.

Operation of the seat belt system 14 with the energy absorber is similar to that of the steering column system 12. An impact force (F) results from the impact of an object within the motor vehicle 10 upon the seat belt 70 sufficient to lock the retractor mechanism 78. The tension force in the seat belt 70 is thereby transferred to the first end 30 of the second member 28. This impact force (F) is dissipated in the same manner as the steering column system once the impact force (F) exceeds a predetermined minimum, thereby engaging and disengaging the projections 36 to provide variable impact force dissipation.

The foregoing description presents two exemplary applications of the present invention. Details of construction have been shown and described for purposes of illustration rather than limitation. Modifications and alterations of the invention may occur to those skilled in the art. For example, it is contemplated that an energy absorbing apparatus according to the present invention could have many applications beyond seat belts and steering columns. For instance, it is contemplated that the present invention could be adapted to absorb the impact force associated with a longitudinal impact transmitted by a child seat disposed on or with a passenger seat. Therefore, it is the following claims, including all equivalents, that define the scope of my invention.

I claim:

1. An energy absorbing apparatus for use in a motor vehicle, said energy absorbing apparatus comprising:

an anchor securely attached to said motor vehicle;

a first member mounted to said anchor and having a first surface;

a second member disposed adjacent to said first member and having a second surface spaced a predetermined distance from said first surface, said second member being adapted to receive an impact force from within said motor vehicle;

a plurality of first projections disposed on said first surface; and a plurality of second projections disposed on said second surface and adapted to engage said first projections, said first and second projections being adapted to disengage when said impact force exceeds a predetermined minimum, thereby providing sliding resistance between said second member and said first member to controllably dissipate and absorb energy from said impact force.

2. An energy absorbing apparatus according to claim 1, wherein said first and second projections comprise hook and loop fastener material.

3. An energy absorbing apparatus according to claim 1, wherein said first and second projections cover portions of said first and second surfaces, respectively, said portions being further defined by a leading edge and a trailing edge and a variable width therebetween, said variable width being operative to provide variable resistance in proportion to movement of said second member relative to said first member.

4. An energy absorbing apparatus according to claim 1, wherein said first and second members further comprise:

a tubular clamp mounted to said anchor and having said first surface disposed on an inner side of said tubular clamp;

a tubular member disposed within said tubular clamp and having said second surface disposed on an outer side of said tubular member.

5. An energy absorbing steering column apparatus for use in a motor vehicle, said steering column apparatus comprising:

a steering column having an inner member within an outer member, said inner member being supported by a support member attached to body structure of said motor vehicle, said outer member being adapted to move axially relative to said inner member when subjected to an impact within said motor vehicle generating an impact force in excess of a predetermined minimum;

an anchor securely attached to said outer member of said steering column;

a first member mounted to said anchor and having a first surface;

a second member disposed adjacent to said first member and having a second surface spaced a predetermined distance from said first surface, said second member being adapted to receive an impact force from within said motor vehicle;

a plurality of first projections disposed on said first surface; and a plurality of second projections disposed on said second surface and adapted to engage said first projections, said first and second projections being adapted to disengage when said impact force exceeds a predetermined minimum, thereby providing sliding resistance between said second member and said first member to controllably dissipate and absorb energy from said impact force.

6. An energy absorbing apparatus according to claim 5, wherein said first and second projections comprise hook and loop fastener material.

7. An energy absorbing apparatus according to claim 5, wherein said first and second projections cover portions of said first and second surfaces, respectively, said portions being further defined by a leading edge and a trailing edge and a variable width therebetween, said variable width being operative to provide variable resistance in proportion to movement of said second member relative to said first member.

8. An energy absorbing apparatus according to claim 5, wherein said first and second members further comprise:

a tubular clamp mounted to said anchor and having said first surface disposed on an inner side of said tubular clamp;

a tubular member disposed within said tubular clamp and having said second surface disposed on an outer side of said tubular member.

9. An energy absorbing seat belt apparatus for use in a motor vehicle, said seat belt apparatus comprising:

a seat belt having one end securely attached to the motor vehicle and an opposite end attached to a belt retractor mechanism, said seat belt retractor adapted to transfer an impact force from within said motor vehicle when said impact force exceeds a predetermined minimum;

an anchor securely attached to said motor vehicle;

a first member mounted to said anchor and having a first surface;

a second member extending from said retractor mechanism and having a second surface spaced a predetermined distance from said first surface;

a plurality of first projections disposed on said first surface; and a plurality of second projections disposed on said second surface and adapted to engage said first projections, said first and second projections being adapted to disengage when said impact force exceeds a predetermined minimum, thereby providing sliding resistance between said second member and said first member to controllably dissipate and absorb energy from said impact force.

10. An energy absorbing apparatus according to claim 9, wherein said first and second projections comprise hook and loop fastener material.

11. An energy absorbing apparatus according to claim 9, wherein said first and second projections cover portions of said first and second surfaces, respectively, said portions being further defined by a leading edge and a trailing edge and a variable width therebetween, said variable width being operative to provide variable resistance in proportion to movement of said second member relative to said first member.

12. An energy absorbing apparatus according to claim 9, wherein said first and second members further comprise:

a tubular clamp mounted to said anchor and having said first surface disposed on an inner side of said tubular clamp;

a tubular member disposed within said tubular clamp and having said second surface disposed on an outer side of said tubular member.

* * * * *